(12) United States Patent
Lu et al.

(10) Patent No.: US 9,136,092 B2
(45) Date of Patent: Sep. 15, 2015

(54) STRUCTURE AND METHOD FOR E-BEAM WRITING

(75) Inventors: Chi-Ta Lu, Sanxing Township, Yilan County (TW); Jia-Guei Jou, New Taipei (TW); Yi-Hsien Chen, Changhua (TW); Peng-Ren Chen, Hsinchu (TW); Dong-Hsu Cheng, Tainan (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/442,635

(22) Filed: Apr. 9, 2012

(65) Prior Publication Data

US 2013/0268901 A1    Oct. 10, 2013

(51) Int. Cl.
| G06F 17/50 | (2006.01) |
| G03F 1/00 | (2012.01) |
| H01J 37/317 | (2006.01) |
| G03F 1/36 | (2012.01) |
| G03F 1/70 | (2012.01) |
| H01J 37/302 | (2006.01) |
| G03F 7/20 | (2006.01) |

(52) U.S. Cl.
CPC ............... *H01J 37/3174* (2013.01); *G03F 1/36* (2013.01); *G03F 1/70* (2013.01); *H01J 37/3026* (2013.01); *G03F 7/70441* (2013.01); *G06F 17/5081* (2013.01); *G06F 2217/12* (2013.01); *H01J 2237/31764* (2013.01)

(58) Field of Classification Search
CPC ..... G03F 1/36; G03F 7/70441; G06F 17/081; G06F 2217/12; H01J 37/3174
USPC ........................................... 716/50–55; 430/5
See application file for complete search history.

(56) References Cited

U.S. PATENT DOCUMENTS

| 7,159,197 B2 * | 1/2007 | Falbo et al. ................ 716/52 |
| 7,487,490 B2 * | 2/2009 | Zhang et al. ............... 716/50 |
| 7,546,558 B2 * | 6/2009 | Beale ....................... 716/106 |
| 7,681,170 B2 * | 3/2010 | Liao et al. ................. 716/50 |
| 7,793,238 B1 * | 9/2010 | Rabkin et al. ............. 716/55 |
| 7,908,572 B2 * | 3/2011 | Zhang ....................... 716/53 |
| 8,084,169 B2 * | 12/2011 | Hamouda ................... 430/5 |
| 8,266,556 B2 * | 9/2012 | Liu et al. ................... 716/53 |
| 2009/0007053 A1 * | 1/2009 | Kim .......................... 716/21 |
| 2009/0070732 A1 * | 3/2009 | Sahouria et al. ........... 716/20 |
| 2009/0241087 A1 * | 9/2009 | Zhang et al. ............... 716/21 |

* cited by examiner

*Primary Examiner* — Helen Rossoshek
(74) *Attorney, Agent, or Firm* — Haynes and Boone, LLP (57) ABSTRACT

The present disclosure provides one embodiment of an integrated circuit (IC) method. The method includes receiving an IC design layout having a main feature; performing an optical proximity correction (OPC) process to the design layout; and thereafter, performing a jog reduction process to the design layout such that jog features of the design layout are reduced.

18 Claims, 10 Drawing Sheets

| CD(rule) | small | 58~120 | 0.25nm | 0.25nm | 0.25nm | |
| --- | --- | --- | --- | --- | --- | --- |
| | median | 120~150 | 0.25nm | 0.75nm | 0.75nm | 0.25nm |
| | big | 150~200 | 0.25nm | 0.75nm | 1nm | 0.75nm |
| | very big | 200~ | 0.25nm | 0.75nm | 1nm | 1nm |

STRUCTURE AND METHOD FOR E-BEAM WRITING

BACKGROUND

In semiconductor industry, an integrated circuit (IC) design is formed on a wafer using various fabrication processes, such as etching, deposition, implantation, annealing polishing and lithography. Especially, a lithography process transfers a pattern from a photomask to the wafer such that etching, implantation or other steps are applied only to predefined regions of the wafer. The photomask includes an IC pattern and is repeatedly used in wafer fabrication.

Usually, the photomask is patterned using an electron beam (e-beam) writing. It is more challenging to form a photomask when semiconductor technologies are continually progressing to smaller feature sizes, such as 65 nanometers, 45 nanometers, and below. Various new lithography processes have been approached for higher resolution such that a small feature can be precisely printed on wafers. For example, optical proximity correction (OPC) is indispensable and is used to tune the IC pattern for improved imaging effect. However, After OPC and other adjustments to the IC pattern, the modified IC pattern is more irregular with much more jogs. The e-beam writing time to mask such a photomask is much long. The mask making cycle time is prolonged and the corresponding mask making cost is higher.

Therefore, what is needed is a method and a system to provide effective IC design for the advanced IC technologies addressing the above problems and reducing the mask making cycle time.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

Figure 1:
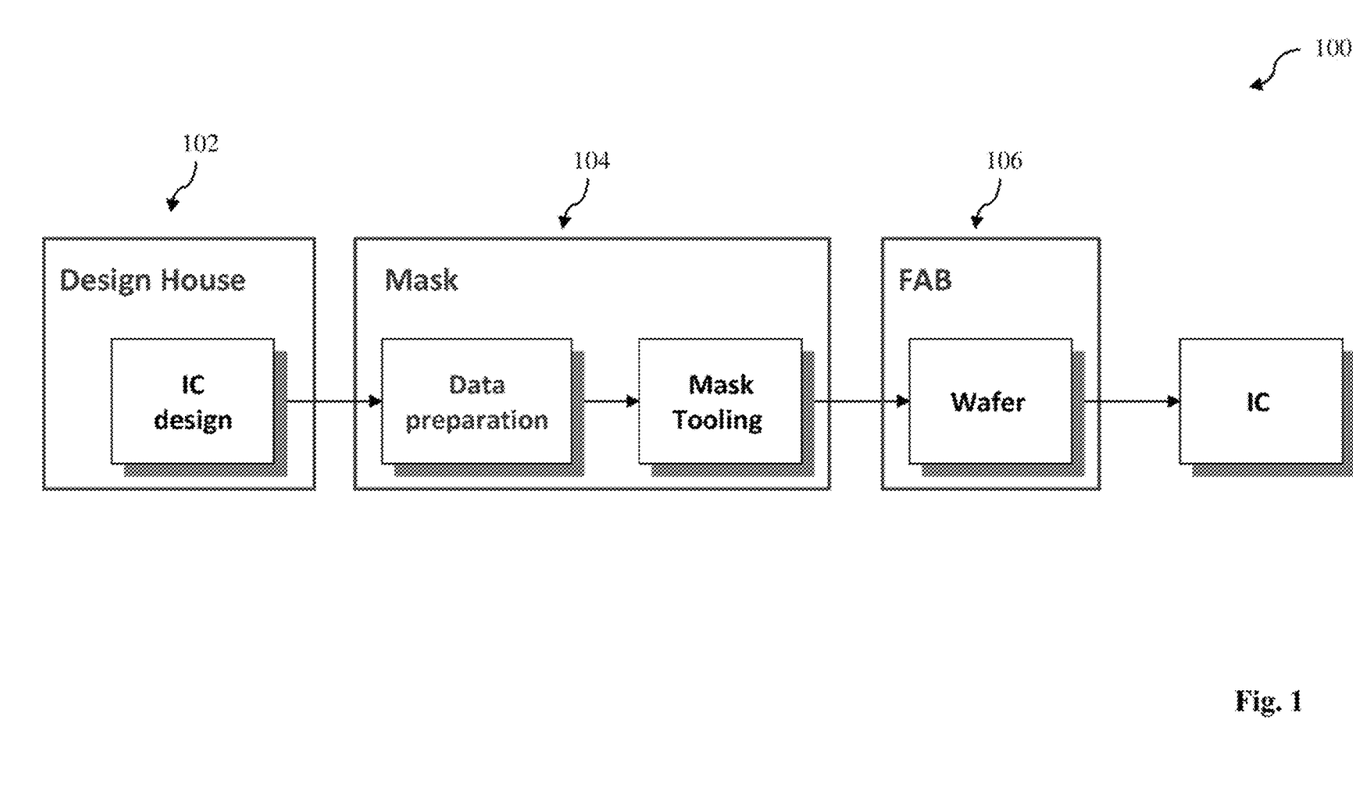
FIG. 1 is a block diagram illustrating an integrated circuit (IC) fabrication flow constructed according to aspects of the present disclosure in one embodiment.

FIG. 1 is a block diagram illustrating an integrated circuit (IC) fabrication flow 100 constructed according to aspects of the present disclosure in one embodiment. An IC circuit fabrication starts from IC design 102 that may be implemented by a design house according to one embodiment. The IC design 102 starts from a design specification and may include logic design, schematic design and physical design. The IC design 102 ends up with an IC design layout provided to a mask making entity.

A mask making 104 may be implemented by the mask making entity, such as a mask shop. The mask making 104 starts from the IC design layout further and includes data preparation and mask tooling associated with fabrication of photomasks. The mask making 104 ends up with one or a set of photomasks (masks or reticles) based on the converted IC design layout after the data preparation. In the present embodiment, the mask tooling includes fabricating a photomask using electron beam (e-beam) technology. The mask making 104 will be further described in FIG. 2.

An IC fabrication entity (or fab) 106 is a semiconductor manufacturer for wafer fabrication. In this embodiment, a semiconductor wafer is fabricated using a mask or a set of masks formed by the above method. The semiconductor wafer includes a silicon substrate or other proper substrate and material layers formed thereon. Other proper substrate may alternatively be made of some suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects.

The semiconductor manufacturer includes various fabrication tools to apply various fabrication processes to a semiconductor wafer for IC fabrication. The fabrication processes include, deposition, etching, polishing, cleaning, annealing and lithography. Especially, the semiconductor manufacturer uses a lithography process to form an IC pattern on the semiconductor wafer. The IC pattern is first transferred from a photomask to a sensitive material layer (such as photoresist). An exemplary lithography process may include processing steps of photoresist spin-on coating, soft baking, mask aligning, exposing, post-exposure baking, developing photoresist and hard baking.

In one example, the photomask is used in an ion implantation process to form various doped regions in the semiconductor wafer. In another example, the photomask is used in an etching process to form various etching regions in the semiconductor wafer. In another example, the photomask is used in a deposition process, such as chemical vapor deposition (CVD) or physical vapor deposition (PVD), to form a thin film in various regions on the semiconductor wafer.

Figure 2:
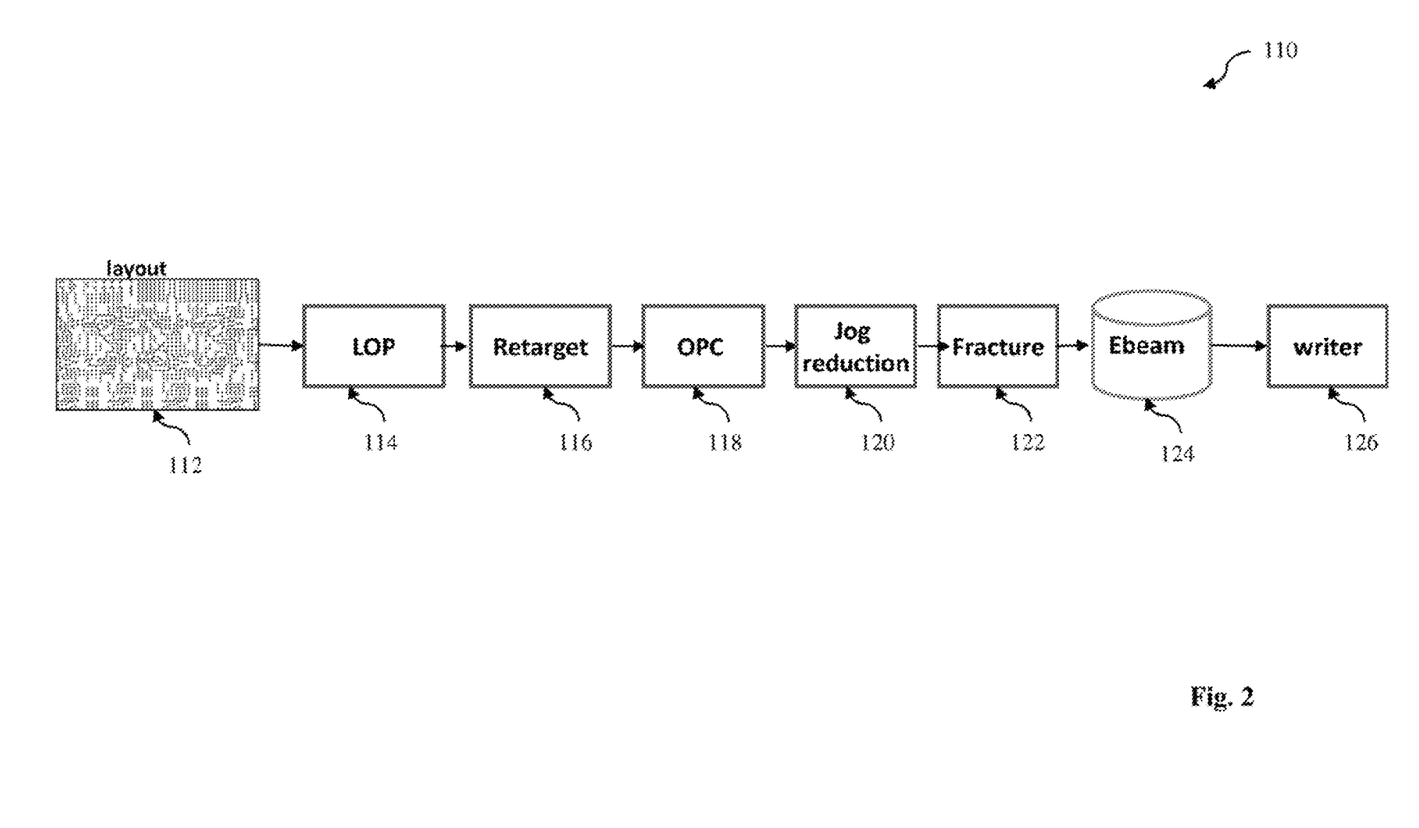
FIG. 2 is a block diagram illustrating a method for IC design and mask making constructed according to aspects of the present disclosure in one embodiment.

FIG. 2 is a flowchart of a method 110 for integrated circuit (IC) designing and mask making constructed according to various aspects of the present disclosure in one or more embodiments. The method 110 is one embodiment of the mask making 104 in FIG. 1. The method 110 begins at step 112 by providing or receiving an IC design layout (or IC design pattern) from a designer. In one example, the designer can be a design house. In another example, the designer is a design team separated from a semiconductor manufacturer assigned for making IC products according to the IC design layout. In various embodiments, the semiconductor manufacturer is capable for making photomasks, semiconductor wafers, or both. The IC design layout includes various geometrical patterns designed for an IC product and based on the specification of an IC product.

The IC design layout is presented in one or more data files having the information of the geometrical patterns. In one example, the IC design layout is expressed in a "gds" format known in the art. The designer, based on the specification of the product to be manufactured, implements a proper design procedure to carry out the IC design layout. The design procedure may include logic design, physical design, and/or place and route. As an example, a portion of the IC design layout includes various IC features (also referred to as main features), such as active region, gate electrode, source and drain, metal lines or via of the interlayer interconnection, and openings for bonding pads, to be formed in a semiconductor substrate (such as a silicon wafer) and various material layers disposed over the semiconductor substrate. The IC design layout may include certain assist features, such as those features for imaging effect, processing enhancement, and/or mask identification information.

Figure 3:
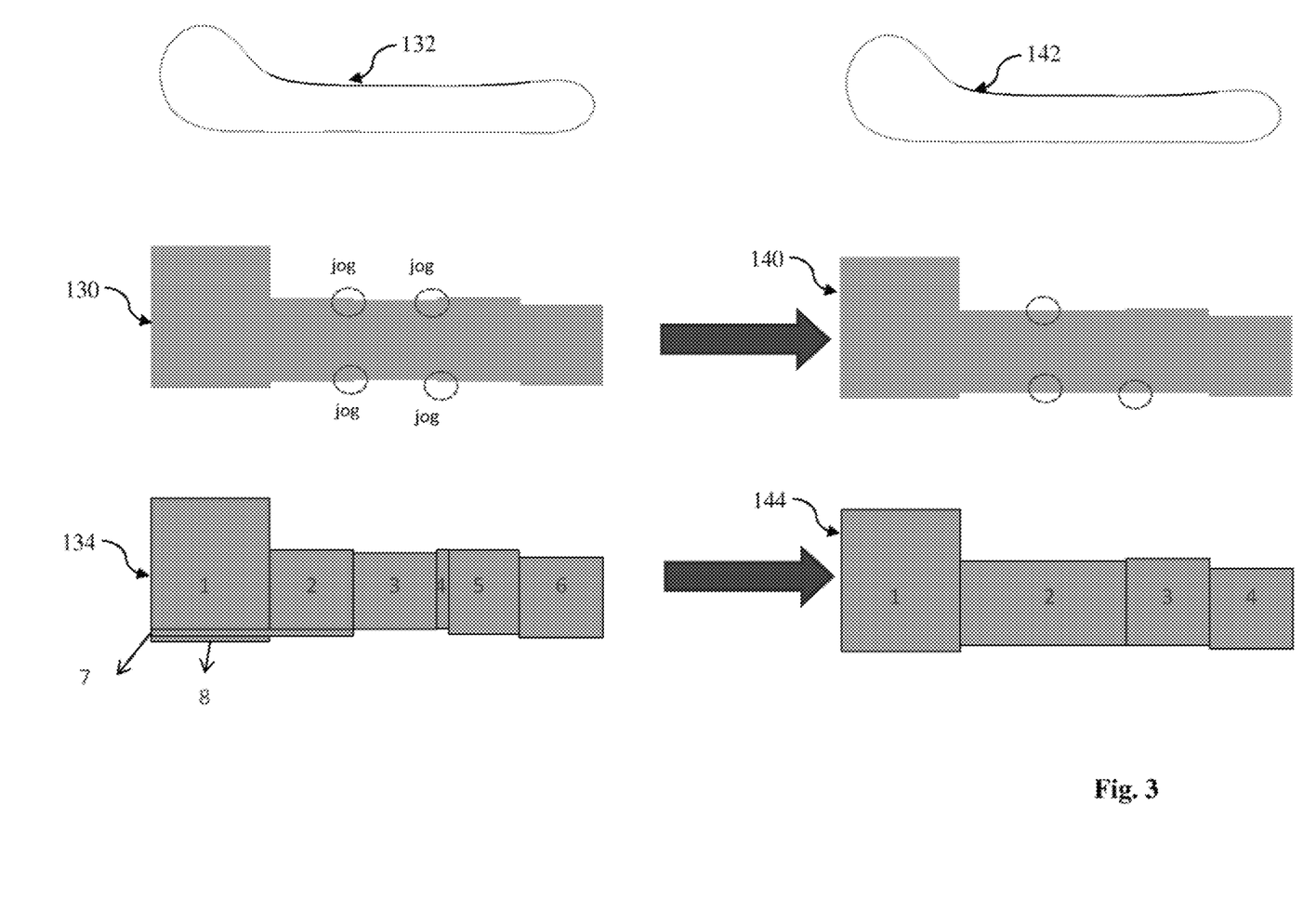
FIG. 3 is a schematic view of various IC design layouts and contours constructed according to aspects of the present disclosure in various embodiments.

The IC design layout 130 having an exemplary main features is shown in FIG. 3 for illustration. In one example, the main feature is a pattern defining a metal line to be formed on a semiconductor substrate. In another example, the main feature includes a design geometry of rectangle.

The method 110 may proceed to step 114 by performing a logic operation (or LOP) to the IC design layout. The logic operation modifies the IC design layout according to the IC manufacturing rules. In this example, the logic operation is performed by the semiconductor manufacturer. Various manufacturer modules convert the manufacturing constrains into a set of rules that the IC design layout has to meet. Otherwise, the IC design layout will be modified accordingly such that the modified IC design layout meets these rules. Such modification is implemented at this step by a logic operation.

The method proceeds to step 116 by performing a retargeting process to the IC design layout. In this step, the IC design layout is modified for improved imaging effect in a rule-based approach. During the retargeting process, the IC design layout is modified according to various rules such that the modified IC design layout has an improved image on a wafer. The modification to the IC design layout at this step includes resizing a main feature, repositioning an edge of the main feature, reshaping the main feature, adding an assist feature to the main feature, adding a scattering bar to the main feature, or a combination thereof.

In one example, various assistant features include a serif feature or a dummy insertion feature. As noted above, a functional element in the integrated circuit is referred to as a main feature. In another example, a scattering bar is spaced away from the main features. In yet another example, a scattering bar is a sub-resolution feature, which has a dimension under the resolution of the lithography process. Thus, those sub-resolution features cannot be imaged on a semiconductor substrate. However, a dummy insertion feature is dimensioned to be imaged to a wafer. For example, the dummy insertion features include dummy isolation features and/or conductive features disposed away from the main features to provide a uniform thermal effect during a thermal process. In another example, dummy insertion features may be added to the IC design layout for enhanced chemical mechanical polishing (CMP) or other processing advantages. Those features are referred to as resolution features.

Additionally, the lithography imaging of the retargeted IC design layout is improved with enhanced resolution and precision. The retargeting process is not only used to incorporate various features but also modifying the main features for optical performance during a lithography process. Alternatively, other features may be added or other action may be applied to tune the IC design layout.

After the retargeting process, the IC design layout is changed and includes various jog features. One jog feature is related to a fragmented edge, wherein one straight edge is fragmented into two or more straight lines with an offset (or shifting) between adjacent straight lines. As one example illustrated in FIG. 3, a main feature 130 includes several jog features, such as those circled.

The method 100 proceeds to step 118 by performing an optical proximate correction (OPC) process to the IC design layout using a model-based approach. During the OPC process, the IC design layout is modified such that the modified IC design layout has an improved image on a wafer. The modification to the IC design layout at this step includes resizing a main feature, repositioning an edge of the main feature, reshaping the main feature, adding an assist feature to the main feature, adding a scattering bar to the main feature, or a combination thereof.

The OPC process is different from the retargeting process in many perspective. First, the OPC process is model-based while the retargeting process is rule-based. Furthermore, the OPC process further includes simulating the IC design layout to generate a contour of the IC design layout. The contour of the IC design layout is an image of the IC design layout when it is transferred from the corresponding photomask to an IC substrate, such as a semiconductor wafer. Based on the difference of the contour and expected IC design layout, this process may be iterated many times until the difference is within a tolerable range. The simulation is based on the manufacturing data. More particularly, the simulation includes simulating the lithography process to transfer the IC design layout from the photomask to the IC substrate according to manufacturing data that includes lithography optical imaging data and may further include resist reaction data. In another example, the manufacturing data may further include etch data such as etching bias.

The simulation is further illustrated in FIG. 3. An IC design layout 130 is provided and includes an exemplary main feature. The contour 132 generated by the simulation is illustrated.

The evaluation process to determine if the contour is acceptable may implement different approaches. In one embodiment, various target points are assigned to the main feature, such as aligning to edges of the main feature. The targets represent spatial locations relative to the main features and are used for simulation verification, particularly as reference points during the OPC process to verify if the contour is acceptable. When the contour edges hit the target points or are close enough to the target points, it is evaluated that the contour is acceptable. Otherwise, the OPC process is iterated until the contour meets the target requirement.

After the retargeting process and OPC process, the IC design layout is changed and has various jog features, such as those shown on the IC design layout 130 in FIG. 3. A jog feature is related to a fragmented edge, wherein one straight edge is fragmented into two or more straight segments with shifting between adjacent straight segments. Specifically, two adjacent segments separated by a jog feature are oriented in a first direction and are connected by a short straight line oriented in a second direction perpendicular to the first direction.

A jog feature may take more e-beam write time and increase cycle time, and further increase the mask making cost. It is more clear when the method 110 proceeds to step 122 by fracturing the IC design layout into multiple polygons or trapeziums for e-beam writing. For example, the IC design layout 130 is converted by the fracturing process into a fractured IC design layout 134 that includes various fractured portions (also referred to as features or slicers) labeled as 1, 2, 3, . . . 7 and 8. In one example, the e-beam writing may be implemented one feature after another feature. However, due to those jog features, the number of figures (figure count) is increased and small figures are present, such as figures "4", "7" and "8". Accordingly, the e-beam writing time is increased.

According to the present disclosure, the method 110 includes a step 120 to perform a jog reduction process to the IC design layout such that the number of the jog features is reduced. The jog reduction process is implemented after the OPC process and before the fracturing process. During the jog reduction process, the segments are adjusted to eliminate one or more jog features when those adjustments have no or limited impact to the contour or the imaging of the IC design layout to the IC substrate.

Referring to FIG. 3, after the jog reduction process, the IC design layout 130 is modified to the IC design layout 140. The number of jog features is reduced from 4 to 3 in this example. However, the corresponding contour 142 of the modified IC design layout 140 by the jog reduction process is substantially not changed relative to the contour 132. Afterward, the modified IC design layout 140 is converted into the fractured IC design layout 144 by the fracturing process. the number of figures is reduced, such as reduced from 8 to 4 in the present example. The jog reduction process is further described later according to various embodiments.

The method 110 then proceeds to step 124 to provide modified IC design layout in a format accessible by a mask making tool, such as an e-beam mask writer. For example, the fracturing process is implemented after the jog reduction process and generates a set of e-beam data that presents the IC design layout in a format accessible by the e-beam writer. The set of e-beam data may be referred to as tape-out for mask making.

The method 110 may further proceed to a step 126 to performing an e-beam writing process to one (or more) photomask according the e-beam data 124 of the IC design layout. The e-beam writing process is executed in an e-beam writer. The e-beam writing process is time efficient due to reduced jog features. During the e-beam writing process, a photomask blank is coated with an electron-sensitive resist layer and transferred to the e-beam writer, one or more e-beams may be generated and directed to the electron-sensitive resist layer. The IC design layout is written to the electron-sensitive resist layer by a proper strategy, such as a raster mode. The electron-sensitive resist layer is further developed to form a patterned resist layer. One (or more) material layer on the photomask blank is etched using the patterned resist layer as an etch mask. In another embodiment, the e-beam may be directly used etch the material layer on the photomask blank according the IC design layout.

The photomask can be formed according to various technologies. In one embodiment, the mask is formed using the binary technology. In this case, the mask pattern includes opaque regions and transparent regions. In one example, the binary mask includes a transparent substrate (e.g., fused quartz), and an opaque material (e.g., chromium) coated in the opaque regions of the mask. In another embodiment, the mask is formed using a phase shift technology. In the phase shift mask (PSM), various features in the pattern formed on the mask are configured to have proper phase difference to enhance the resolution and imaging quality. In various examples, the phase shift mask can be attenuated PSM, alternating PSM or chrome-less PSM known in the art or other phase shift masks to be developed in the future.

The method 110 may further other steps. For example, the method may include mask rule check (MRC) to the IC design layout. At this step, the IC design layout is further checked by the mask rule and modified accordingly. In one embodiment, the mask rules in the MRC process are extracted from the mask fabrication. Various mask making data are collected from the mask fabrication and extracted into a set of rules that the IC design layout, as the pattern to be imaged to a mask, should follow. In another example, the mask rules or a subset of the mask rules are used as a guideline to further tune the IC design layout.

Figure 4:
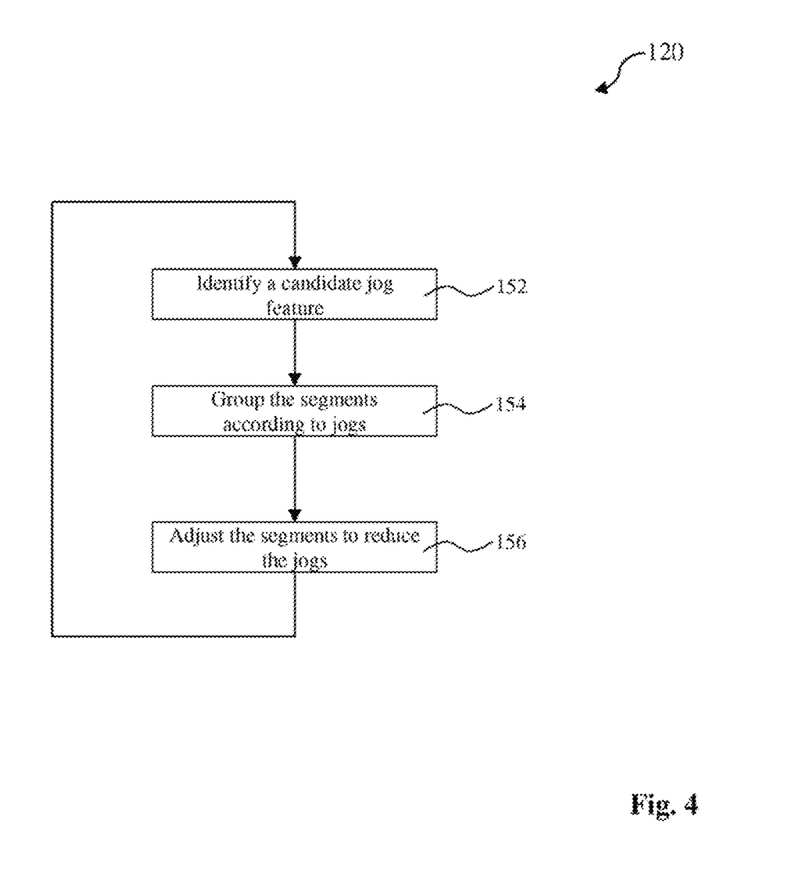
FIG. 4 is a flowchart of a method for jog reduction constructed according to aspects of the present disclosure in one embodiment.

FIG. 4 is a flowchart of a method 120 for jog reduction constructed according to one embodiment. The method 120 of FIG. 4 is an embodiment of the jog reduction process 120 in FIG. 2. The method 120 includes a step 152 by identifying a candidate jog feature (or more candidate jog features) from an IC design layout. The identified candidate jog feature is further processed by the subsequent steps of the method 120 for elimination. The identification of a candidate jog feature is implemented according to one or more rules and may follow a proper procedure.

Figure 5:
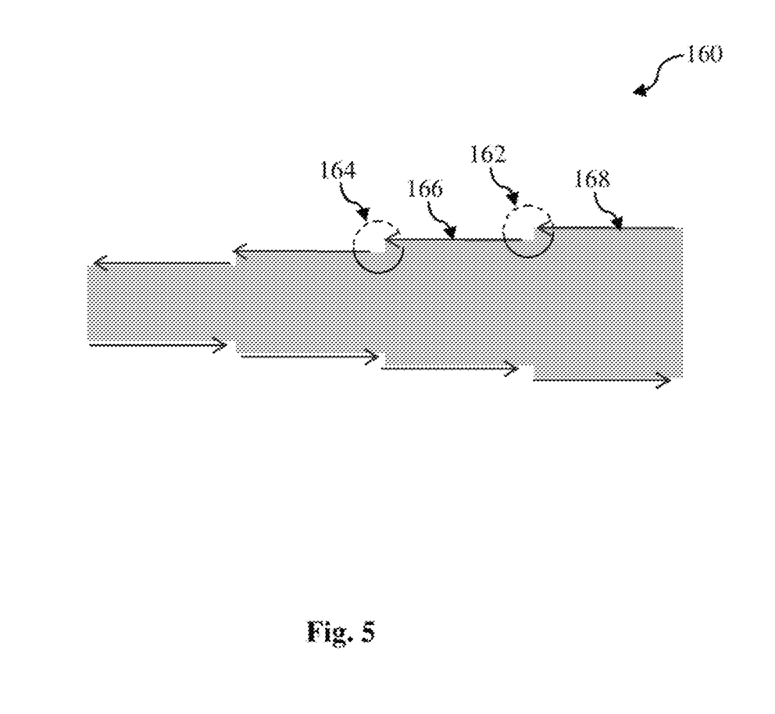
FIG. 5 is a schematic view of a main feature constructed according to aspects of the present disclosure in one embodiment.

An IC design layout includes a plurality of main features. Each main feature may include one or more jog features after retargeting process and OPC. When identifying a candidate jog feature, each main feature of the IC design layout is evaluated. When evaluating one main feature, each jog feature of the main feature is evaluated if it is a candidate jog feature based on one or more rules. FIG. 5 illustrates a main feature 160 that has multiple edges and one or more jog features, such as jog features 162 and 164. Furthermore, the main feature 160 has 4 figures for e-beam writing or the figure count is 4. In one embodiment, all jog features are evaluated in sequence one by one, such as in a segment loop mode as illustrated by arrowed lines in FIG. 5. Thus, all jog features of the main feature 160 are evaluated when walking through the jog feature in a counterclockwise loop (or alternatively in a clockwise loop).

Still referring to the main feature 160 in FIG. 5 as an example for illustration, the main feature 160 includes a plurality of segments, such as segments 166 and 168. A segment is defined as an edge portion that can be adjusted and tuned during the OPC process, the retargeting process and the jog-reduction process. In the present example, a segment is a straight portion of the edges of main feature and spans between two neighboring jog features. For example, the segment 166 is a straight edge between the neighboring jog features 162 and 164. In another example, When the two neighboring jog features are separated by a long straight edge, this long straight edge is divided into two or more segments such that each segment has a length that can be handled by the OPC process (and other processes including the jog reduction process). In this case, a segment is not defined by and ended with two jog features.

Still referring to the main feature 160 of FIG. 5, when a jog feature is evaluated, various rules are applied to determine if the jog feature is a candidate. Take the jog feature 162 as an example, various dimensions associated with the jog feature 162 are considered during identification. A portion of the main feature 162 associated with the jog feature 162 is further illustrated n FIG. 6 for clarity. Specifically, two features of the main feature 160 are illustrated in FIG. 6.

Figure 6:
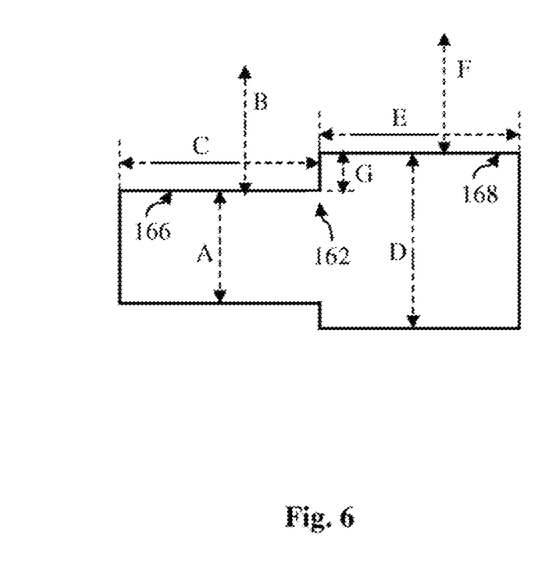
FIG. 6 is a schematic view of the main feature of FIG. 5 in portion constructed according to aspects of the present disclosure in one embodiment.

In one embodiment, the main feature critical dimensions (CDs) associated with the jog feature 162 are considered, such as the CD parameters "A" and "D" illustrated in FIG. 6. When CD parameters are greater, the jog feature 162 is more likely to be a candidate jog feature since adjusting the segments has less impact to the corresponding CD parameters. In one example, when a relevant CD parameter (A, D or the smallest) is greater than a CD criteria, the corresponding jog feature 162 may be considered as a candidate jog feature if other rules are also satisfied.

In another embodiment, the main feature spacing parameters associated with the jog feature 162 are considered, such as the spacing parameters "B" and "F" illustrated in FIG. 6. A spacing parameter is defined as the spacing between the main feature and an adjacent feature (not shown in FIG. 6). When a spacing parameters are greater, the corresponding jog feature 162 is more likely to be a candidate jog feature since adjusting the segments has less impact to the corresponding spacing parameters. In one example, when a relevant spacing parameter (B, F or the smallest one) is greater than a spacing criteria, the jog feature 162 may be considered as a candidate jog feature if other rules are also satisfied.

In yet another embodiment, a jog rule is applied. For example, the jog height "G" of the jog feature 162 is considered. When the jog height "G" is greater, the jog feature 162 is less likely to be a candidate jog feature since adjustment of the segments to eliminate the jog feature is greater and therefore has more impact to the imaging of the main feature 160. In one example, when the jog height is greater than a height criteria, the jog feature 162 may be considered as a candidate jog feature if other rules are also satisfied.

In yet another embodiment, a segment rule is applied. For example, the segment lengths associated with the jog feature 162 are considered, such as the segment lengths "C" and "E" illustrated in FIG. 6. When segment length are greater, the corresponding jog feature 162 is less likely to be a candidate jog feature since adjusting those segments will have more impact to the main feature 162. In one example, when a relevant segment length (C, E or both) is greater than a length criteria, the jog feature 162 is not considered as a candidate jog feature. When the relevant segment length is less than the length criteria, the jog feature 162 is considered as a candidate jog feature if other rules are satisfied.

In yet another embodiment, various rules are quantitatively constructed in a lookup table. The identification of a candidate jog feature is based on the lookup table.

Figure 7:
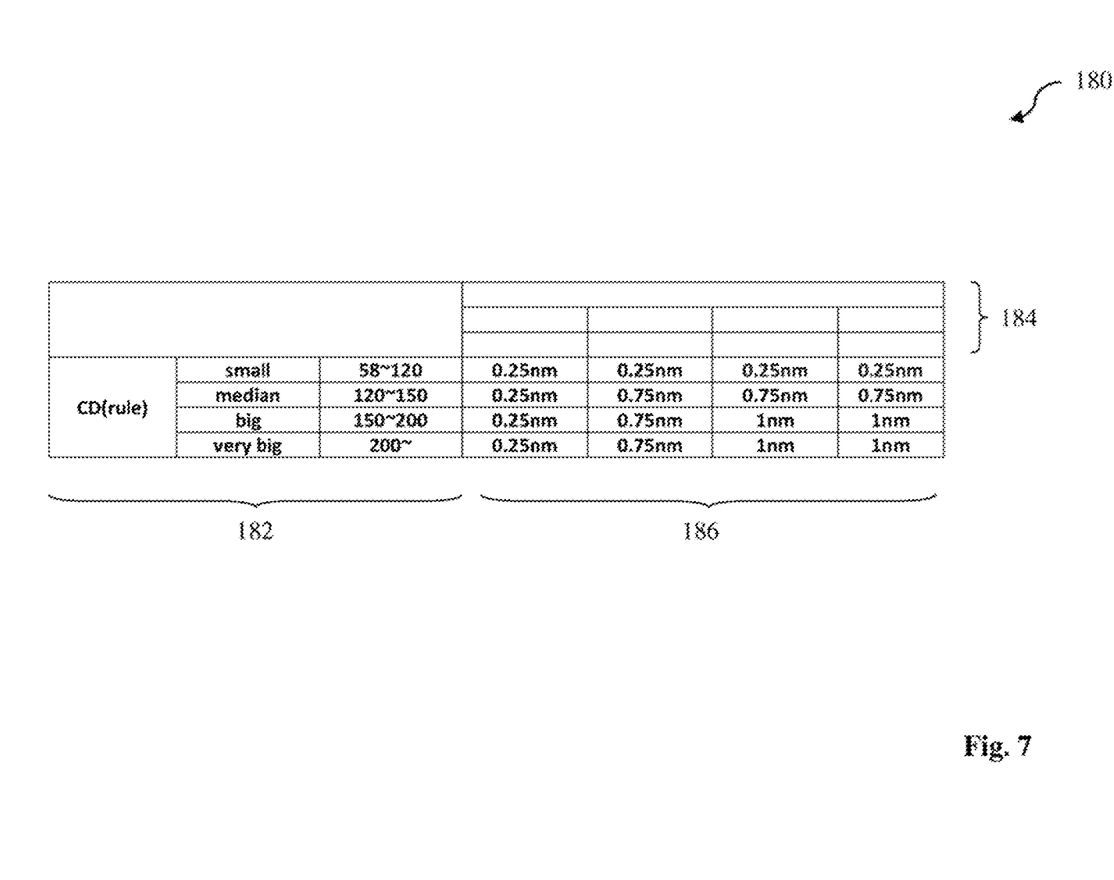
FIG. 7 illustrates a lookup table constructed according to aspects of the present disclosure in one embodiment.

In the present embodiment, a lookup table 180 constructed according to a set of parameters including CD parameter, spacing parameter and jog height. The lookup table 180 is illustrated in FIG. 7 constructed according to aspects of the present disclosure in one embodiment. The lookup table 180 includes a CD parameter shown in the left columns 182, a spacing parameter shown in the top rows 184, and jog height shown in the right bottom portion 186 of the lookup table 180.

As one example, the jog feature 160 in FIG. 5 is evaluated using the lookup table 180. Referring to FIG. 6, the smallest one of CD parameters "A" and "D" is checked on the lookup table 180 and a corresponding row is determined. If the smallest of "A" and "D" is 130 nm, the row labeled as "median" is determined. Similarly, the smallest one of spacing parameters "B" and "F" is checked on the lookup table 180 and a corresponding column is determined. If the smallest of "B" and "F" is 160 nm, the column labeled as "big" is determined. Thus, the block in both the "median" row and the "big" column has a value as 0.75 nm. If the jog height G is less than 0.75, then the jog feature 162 is a candidate jog feature.

In furtherance of the present embodiment, the segment length is another parameter to be further evaluated to determine if the jog feature is a candidate jog feature. In the above example, when the jog height is less than 0.75 nm from the lookup table 180, the segment length C is less than the length criteria X and the segment length E is less than the length criteria X, then the jog feature 162 is considered as a candidate jog feature.

Referring back to FIG. 4, after one or more candidate jog features are identified, the method 120 may proceed to step 154 by grouping the segments according to jog features. In this case, the adjustment of the segments in the following step is performed according to the grouping. Particularly, when a segment is adjusted, other segment (or segments) in the same group is considered to be adjusted as well.

In one embodiment, the grouping is based on a number of the jog features on one side of the main feature. Specifically, the grouping is based on whether the number of the jog features on one side of the main feature is odd or even. For example, if the number of the jog features is odd, the segments may be grouped by two segment per group. If the number of the jog features is odd, the segments may be grouped by two per group, three per group or combinations thereof.

Figure 8:
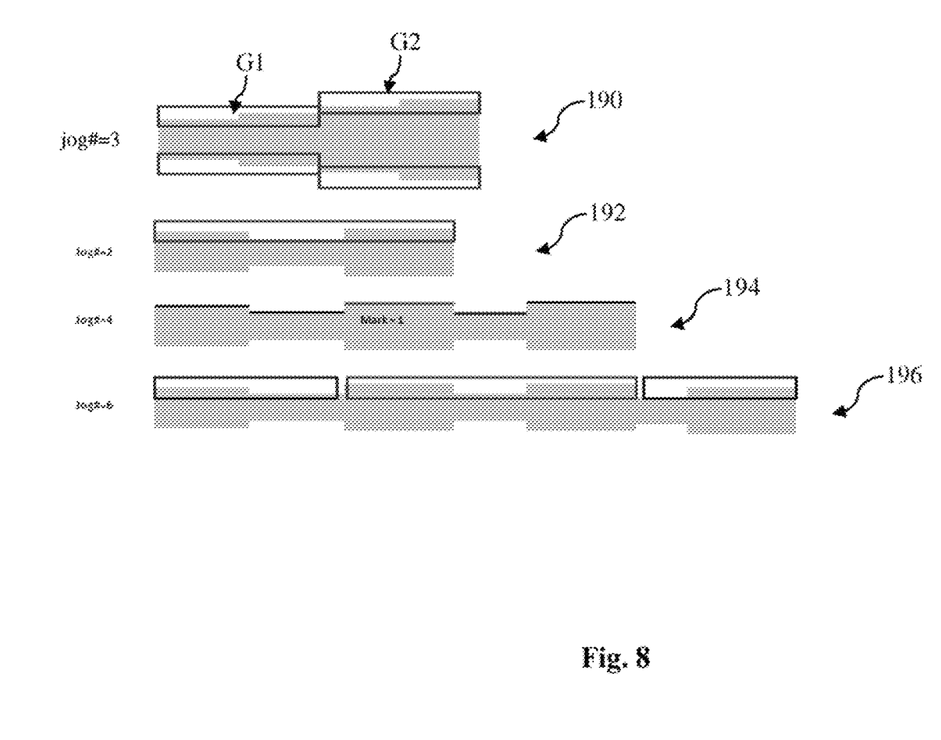
FIG. 8 is a schematic view of various main features constructed according to aspects of the present disclosure in various embodiments.

FIG. 8 illustrate various examples of the grouping of segments. In FIG. 8, the main feature 190 includes 3 jog features on top side, and the segments of the top side are grouped by two per group, such group G1 and G2 each having two segments. Similarly, the main feature 190 includes 3 jog features on bottom side, and the segments of the bottom side are grouped by two per group.

In FIG. 8, the main feature 192 includes 2 jog features on top side, and the 3 segments of the top side are all grouped together in one group. The main feature 194 includes 4 jog features on top side. In this case, the left 2 segments on the top side are in a first group, the middle segment stands alone as a second group, and the right two segments are in a third group. The main feature 196 includes 6 jog features on top side. In this case, the left 2 segments on the top side are in a first group, the middle 3 segment are in a second group, and the right two segments are in a third group.

Back to FIG. 4, the method proceeds to step 156 by performing adjustment to the segments to reduce the jog features. The adjustments are applied to the segments associated with the candidate jog feature(s). The segments around a candidate jog feature are moved such that the jog feature is eliminated. In one embodiment, the adjustments are collectively implemented to the segments in the same group having a candidate jog feature therein.

Figure 9:
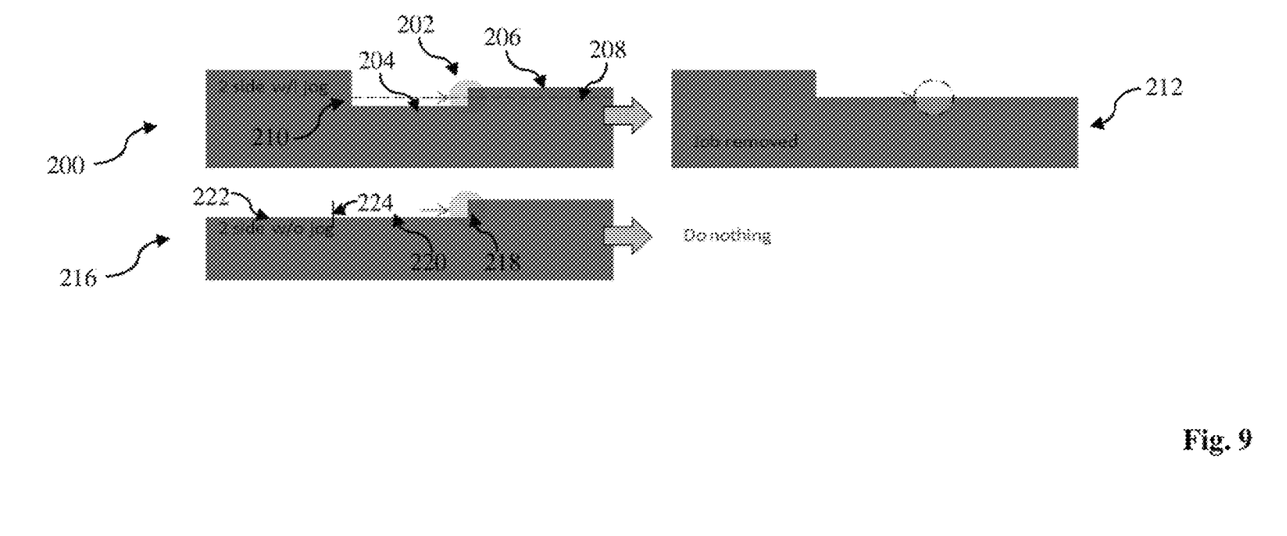
FIG. 9 is a schematic view of various main features constructed according to aspects of the present disclosure in various embodiments.

FIG. 9 illustrates various examples of the adjustments implemented at step 156. In FIG. 9, the main feature 200 includes a candidate jog feature 202 identified at step 152. The relevant segments 204 and 206 are adjusted such that the segments 204 and 206 are aligned in a straight line. Accordingly, the jog feature 202 is eliminated. In one embodiment, the both segments are moved toward the dashed line 208 such that the jog feature 202 is eliminated. In another embodiment, when the candidate jog feature 202 is considered, the segments around the jog feature 202 and in the same group defined at step 154 are collectively evaluated for the adjustment. Especially, when the segment 204 have jog features (202 and 210) on both ends, the adjustment to the segment 204 is able to effectively reduce the jog feature 202. Accordingly, the segment 204 is moved (the another segment 206 adjacent the jog feature 202 may be moved as well) such that the jog feature 202 is eliminated. The modified main feature 212 from the main feature 200 after the adjustment is illustrated on the right of the main feature 200 in FIG. 9. As illustrated, the modified main feature 212 eliminates the jog feature 202. The figure count of the main feature is also reduced from 3 in the main feature 200 to 2 in the modified main feature 212.

When the adjustment can not effectively eliminate any jog feature, the adjustment is skipped. In one embodiment, a main feature 216 in FIG. 9 includes a candidate jog feature 218. On the left side of the jog feature 218, there are two segments 220 and 222 separated at the position 224. Therefore, the segment 220 has one jog feature 218 on the right end but has not jog feature at the left end 224. Therefore, the adjustment to the segment 220 may eliminate the jog feature 218 but generates another jog feature at the left end 224. In this case, the adjustment to the segment 220 cannot effectively reduce the number of the jog features, the adjustment to the segments associated with the jog feature 218 is skipped.

The jog reduction process may be applied to the segments associated with each candidate until the candidate jog features are exhausted. In one embodiment, the jog reduction process may include an iteration process until the modified IC design layout is capable of producing an acceptable image from the respective photomask to a wafer with minimized jog features and minimized figure count.

Figure 10:
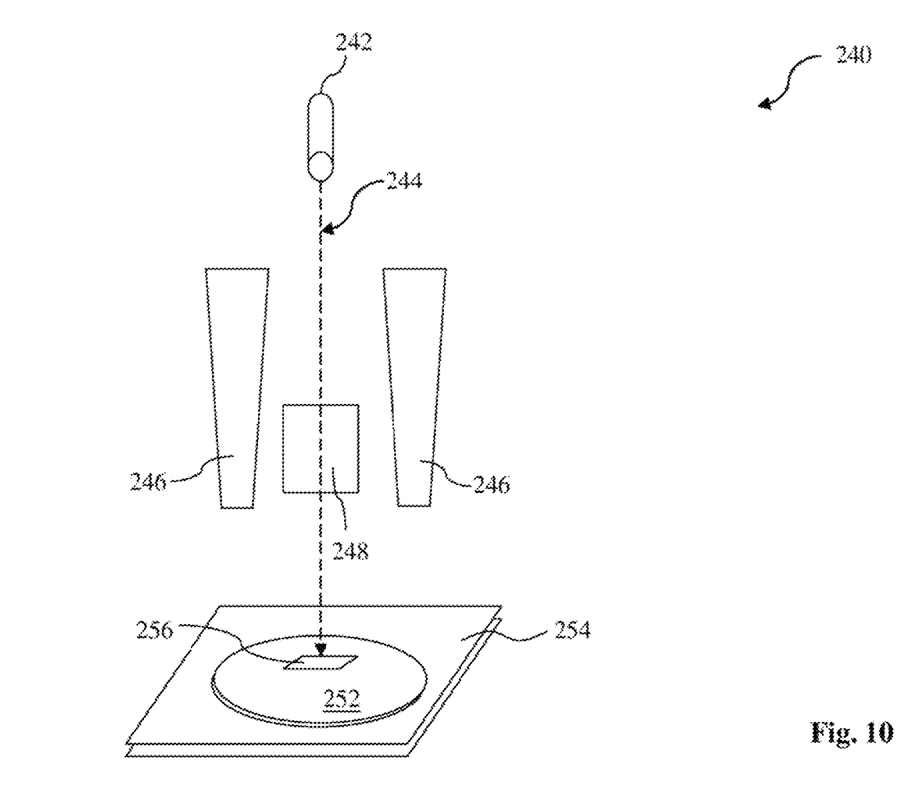
FIG. 10 is a schematic view of an e-beam system for e-beam writing constructed according to aspects of the present disclosure in one embodiment.

FIG. 10 is a schematic view of an e-beam system 240 constructed according to aspects of one embodiment of the present disclosure. The e-beam system 240 may be used at step 126 of the method 100 in FIG. 2 for e-beam writing. The electron-based system 240 is an electron-based system that utilizes an electron-based imaging.

The electron-based system 240 includes an e-beam source 242 to provide one or more e-beams. In one embodiment, the e-beam source 242 is an electron gun with a mechanism to generate electrons, such as by thermal electron emission. In a particular example, the electron gun includes a tungsten (or other suitable material) filament designed and biased to thermally emit electrons. In FIG. 10, an electron beam 244 is illustrated as an incident electron beam from the source and directed toward a mask 252 to be patterned.

The electron-based system 240 includes one or more lenses 246 to impact the electron incident beam 244 from the source 242 for imaging effect. In one embodiment, the lenses 246 includes a condenser and further includes an objective lens properly configured. Various lenses, such as magnets, are designed to provide force to the electrons for proper imaging effect, such as focusing.

The electron-based system 240 also includes a scanner 248 to deflect the electron beam 244 for scanning a certain region of the mask 252 in a certain mode, such as raster mode. The scanner 248 is operable to direct the electron beam 244 to the mask 252 positioned on a stage 254. In one example, the scanner 248 may include one or more coils to deflect the electron beam 244 in two orthogonal directions such that the electron beam is scanned over a surface area (a field) 256 of the mask 252.

Figure 11:
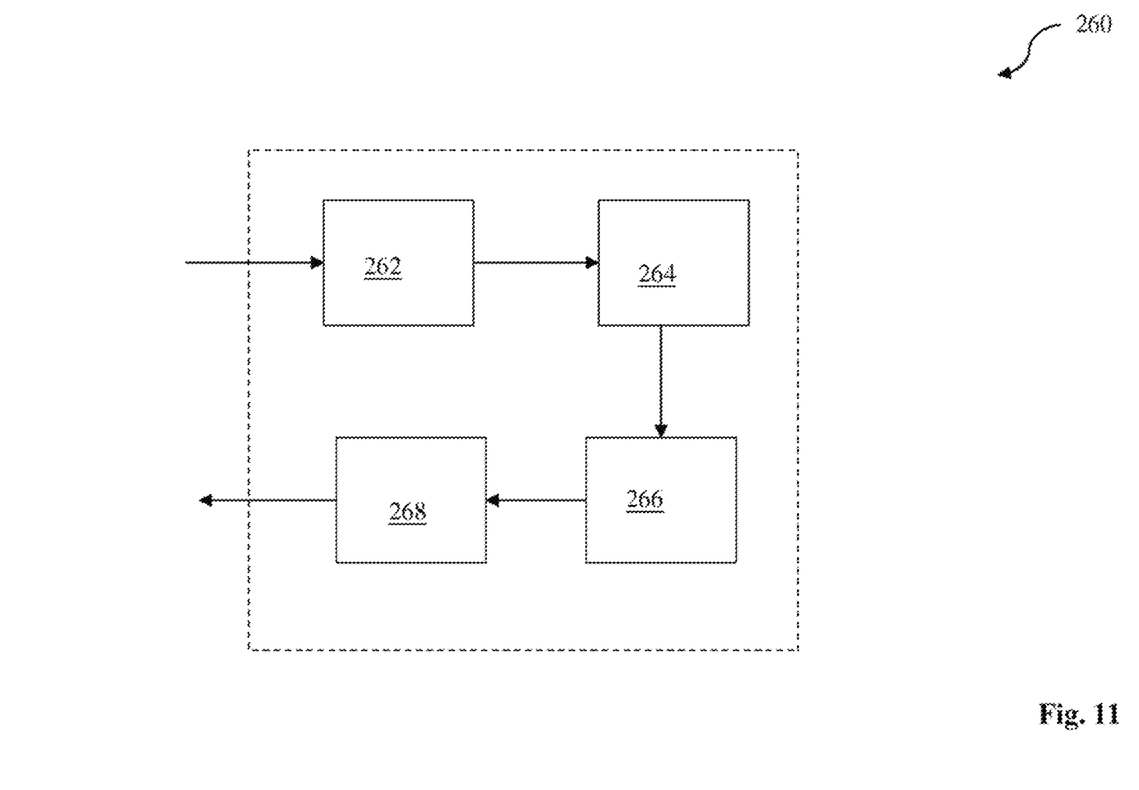
FIG. 11 is a schematic view of a tape-out system constructed according to aspects of the present disclosure in one embodiment.

FIG. 11 illustrates a schematic view of a system 260 of generating a tape-out for mask making. The tape-out system 260 includes both hardware and software integrated to perform various actions to generate a tape-out for e-beam writing. In one embodiment, the tape-out system 260 is designed to perform various steps in the method 110 of FIG. 2. In one particular embodiment, the tape-out system 260 is operable to perform an retargeting process, an OPC process and jog reduction process and a fracturing process.

The tape-out system 260 includes a retargeting module 262 designed to perform a retargeting process to an integrated circuit (IC) design layout in a rule-based mode. The retargeting module 262 includes various rules for retargeting process or is coupled with a database having those rules. The retargeting module 262 is configured to take an input of an IC design layout and provide an output of another IC design layout modified by the retargeting process.

The tape-out system 260 includes an OPC module 264 designed to perform an OPC process to an IC design layout in a model-based mode. The OPC module 264 is designed to be capable of simulating mask making and wafer fabrication and be capable of generating a contour of the IC design layout. The OPC module 264 includes various manufacturing data for simulation or is coupled with a database having those manufacturing data. In one embodiment, the OPC module 264 is operable to assign target points, tuning the IC design layout, simulating the contour of the IC design layout, and check if the assigned target points are satisfied. The OPC module 264 is configured to take an input of an IC design layout and provide an output of another IC design layout modified by the OPC process.

The tape-out system 260 includes a jog-reduction module 266 designed to perform a jog reduction process to an IC design layout. The jog-reduction module 266 is operable to perform a jog-reduction process to an IC design layout such that a number of jog features associated with the IC design layout is reduced. In one embodiment, the jog-reduction module 266 is designed to perform a jog-reduction process 120 of FIG. 4. The jog-reduction module 266 is configured to take an input of an IC design layout and provide an output of another IC design layout with less number of jog features and modified by the jog-reduction process.

The tape-out system 260 may further include a fracturing module 268 designed to perform a fracturing process to an IC design layout. The fracturing module 268 is operable to perform a fracturing process to an IC design layout such that the IC design layout is presented in a format for mask making by an e-beam writer. The fracturing module 268 is configured to take an input of an IC design layout and provide a tape-out for mask making.

In one embodiment, the retargeting module 262 takes an IC design layout and modifies the IC design layout by the retargeting process. The OPC module 264 takes the IC design layout from the retargeting module 262 and modifies the IC design layout by the OPC process. The jog-reduction module 266 takes the IC design layout from the OPC module 264 and modifies the IC design layout by the jog-reduction process. The fracturing module 268 takes the IC design layout from the jog-reduction module 266 and generates a tape-out for mask making.

Although various embodiments of the present disclosure are provided above. Other embodiments may be present without departure from the spirit of the present disclosure. For example, the tape-out system 260 may be a separate entity or may be distributed in existing entities, such as a design/lab facility or an online system. In the present example, the tape-out system 260 is connected to a network, such as the Internet or a intranet.

In another embodiment, the disclosed method 110 may be directly used in wafer fabrication. For example, e-beam technology, such as e-beam writing, is used to pattern semiconductor wafer. The tape-out generated at step 124 is provided to the e-beam writer for e-beam writing directly on an IC substrate, such as a semiconductor wafer or a LCD flat panel substrate. Accordingly, the method 120 for jog-reduction is implemented in the method 110 to generate a tape-out for wafer fabrication by e-beam technology.

Thus, the present disclosure provides an integrated circuit (IC) method. The IC method includes receiving an IC design layout having a main feature; performing an optical proximity correction (OPC) process to the design layout; and thereafter, performing a jog reduction process to the design layout such that jog features of the design layout are reduced.

In one embodiment, the IC method further includes fracturing the design layout into a plurality of fractured polygons for masking mask. In another embodiment, the IC method further includes making a photomask using an electron-beam technology based on the fractured polygons.

In another embodiment, the IC method further include, before the performing an OPC process to the design layout, performing a logic operation to the design layout; and performing a retargeting process to the design layout using a rule-based approach.

In yet another embodiment, the jog reduction process includes eliminating a jog feature if the corresponding chip impact is neglectable.

In yet another embodiment, the jog reduction process includes identifying a candidate jog feature of the main feature according to at least one jog/segment rule; grouping a subset of segments of the main feature associated with the candidate jog feature; and adjusting the subset of segments to eliminate the candidate jog feature.

In yet another embodiment, the identifying a candidate jog feature of the main feature includes tracing through jog features of the main feature in a segment loop mode.

In yet another embodiment, the at least one jog/segment rule includes a jog rule that a jog height is less than a first dimension; and a segment rule that two adjacent segments are less than a second dimension.

In yet another embodiment, the identifying a candidate jog feature of the main feature includes using a lookup table defined by a set of parameters. In another embodiment, the set of parameters include critical dimension, spacing and jog height.

In yet another embodiment, the grouping a subset of segments of the main feature includes grouping a subset of segments of the main feature according to a number of jog features in one side of the main feature.

In yet another embodiment, the adjusting the subset of segments includes moving one of the subset of segments if the one segment is bordered by two jog features on both ends.

In yet another embodiment, the adjusting the subset of segments includes moving the subset of segments in coordination such that the candidate jog feature is eliminated.

The present disclosure also provides another embodiment of an IC method. The IC method includes receiving an IC design layout having a main feature; performing a retargeting process to the main feature in a rule-based mode; performing an optical proximity correction (OPC) process to the main feature in model-based mode, resulting in a number of jog features in the main feature; and thereafter, performing a jog reduction process to the main feature such that the number of jog features is reduced.

In one embodiment, the IC method further includes, after the performing a jog reduction process, fracturing the design layout into a plurality of fractured polygons for masking mask by an electron-beam technology.

In another embodiment, the jog reduction process includes identifying a candidate jog feature of the main feature according to at least one of jog height, segment length, critical dimension and spacing; and adjusting a segment ending at the candidate jog feature to eliminate the candidate jog feature.

In yet another embodiment, the IC method further includes grouping a subset of segments approximate the candidate jog feature; and collectively adjusting the subset of segments such that the candidate jog feature is eliminated.

In yet another embodiment, the identifying a candidate jog feature of the main feature includes using a lookup table associated with a set of parameters including spacing, critical dimension and jog height.

The present disclosure also provides one embodiment of a system of generating a tape-out for mask making. The system includes a first module for performing a retargeting process to an integrated circuit (IC) design layout in a rule-based mode; a second module for performing an optical proximity correction (OPC) process to the IC design layout in a model-based mode; and a third module for performing a jog reduction process to the IC design layout such that a number of jog features in the IC design layout is reduced.

In one embodiment, the system further includes a fourth module for fracturing the IC design layout to generate a tape-out of the IC design layout for mask making.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) method comprising:
receiving an IC design layout having a main feature including a first side having a first number of jog features and segments and a second side opposite the first side, wherein the second side has a second number of jog features and segments equal to the first number, and wherein each of the jog features and segments of the first side are aligned opposite to the jog features and segments of the second side, the IC design layout being presented in one or more data files;
performing an optical proximity correction (OPC) process to the IC design layout;
identifying a candidate jog feature for elimination from a plurality of jog features present on either side of the line of symmetry passing through the main feature, the identifying based upon evaluation of each jog feature of the plurality of jog features in sequence, and the evaluation of each jog feature based upon at least one parameter from a set of parameters of the candidate jog feature;
thereafter, performing a jog reduction process to the IC design layout, by elimination of the candidate jog feature from each of the first and second sides, such that jog features of the IC design layout are reduced, wherein the jog reduction process includes grouping two segments per group on each of the first and second sides when a number of jog features on each of the first and second sides is odd, and wherein the jog reduction process includes grouping segments according to a grouping selected from a group of one, a group of two, and a group of three per group on each of the first and second sides when the number of jog features on each of the first and second sides is even;

fracturing the IC design layout into a plurality of fractured polygons for mask making in a modified IC design layout that is in a format accessible to a mask making tool; and patterning a photomask using a mask making tool based on the plurality of fractured polygons.

2. The IC method of claim 1, wherein the format accessible to a mask making tool is a GDS format.

3. The IC method of claim 2, wherein the mask making tool is an electron-beam writer.

4. The IC method of claim 1, further comprising, before the performing the OPC process to the IC design layout:
   performing a logic operation to the IC design layout; and
   performing a retargeting process to the IC design layout using a rule-based approach.

5. The IC method of claim 1, wherein the jog reduction process includes eliminating a jog feature if a corresponding chip impact is neglectable.

6. The IC method of claim 1, wherein the jog reduction process includes:
   further identifying the candidate jog feature of the main feature according to at least one jog/segment rule; and
   adjusting the grouped segments to eliminate the candidate jog feature.

7. The IC method of claim 6, wherein the identifying the candidate jog feature of the main feature includes tracing through jog features of the main feature in a segment loop mode.

8. The IC method of claim 6, wherein the at least one jog/segment rule includes:
   a jog rule that a jog height is less than a first dimension; and
   a segment rule that two adjacent segments are less than a second dimension.

9. The IC method of claim 6, wherein the identifying the candidate jog feature of the main feature includes using a lookup table defined by the set of parameters.

10. The IC method of claim 9, wherein the set of parameters includes critical dimension parameters, spacing parameters, and jog height parameters.

11. The IC method of claim 6, wherein the adjusting the grouped segments includes moving one segment of the grouped segments if the one segment is bordered by a jog feature on both ends.

12. The IC method of claim 6, wherein the adjusting the grouped segments includes moving the grouped segments in coordination such that the candidate jog feature is eliminated.

13. An integrated circuit (IC) method comprising:
   receiving an IC design layout having a main feature including a first side having a first number of jog features and segments and a second side opposite the first side, wherein the second side has a second number of jog features and segments equal to the first number, and wherein each of the jog features and segments of the first side are aligned opposite to the jog features and segments of the second side, the IC design layout being presented in one or more data files;
   performing a retargeting process to the main feature in a rule-based mode;
   performing an optical proximity correction (OPC) process to the main feature in a model-based mode, resulting in a number of jog features on each of the first and second sides of the main feature;
   identifying a candidate jog feature for elimination from the number of jog features present on each of the first and second sides, the identifying based upon at least one parameter of the candidate jog feature from a set of parameters that includes at least a critical dimension parameter of the main feature, the critical dimension parameter being measured orthogonally to the candidate jog feature, the identifying based upon evaluation of each jog feature of the number of jog features in sequence;
   thereafter, performing a jog reduction process to the main feature, by elimination of the candidate jog feature from each of the first and second sides, such that the number of jog features is reduced in a modified IC design layout that is in a format accessible to a mask making tool, wherein the jog reduction process includes grouping two segments per group on each of the first and second sides when the number of jog features on each of the first and second sides is odd, and wherein the jog reduction process includes grouping segments according to a grouping selected from a group of one, a group of two, and a group of three per group on each of the first and second sides when the number of jog features on each of the first and second sides is even and
   patterning a photomask using a mask making tool based on a plurality of fractured polygons formed from the modified IC design layout.

14. The IC method of claim 13, further comprising, fracturing the modified IC design layout into the plurality of fractured polygons for mask making by an electron-beam tool.

15. The IC method of claim 13, wherein the jog reduction process includes:
   identifying the candidate jog feature of the main feature according to the set of parameters, the set of parameters include at least one of jog height, segment length, and spacing between an adjacent feature the main feature; and
   adjusting a segment ending at the candidate jog feature to eliminate the candidate jog feature.

16. The IC method of claim 15, further comprising:
   grouping a subset of segments approximate the candidate jog feature; and
   collectively adjusting the subset of segments such that the candidate jog feature is eliminated.

17. The IC method of claim 15, wherein the identifying the candidate jog feature of the main feature includes using a lookup table associated with the set of parameters.

18. A system of generating a tape-out for mask making from an integrated circuit design layout having a main feature including first side having a first number of jog features and segments and a second side opposite the first side, wherein the second side has a second number of jog features and segments equal to the first number, and wherein each of the jog features and segments of the first side are aligned opposite to the jog features and segments of the second side, the system, comprising:
   a first module for performing a retargeting process to an integrated circuit (IC) design layout in a rule-based mode;

a second module for performing an optical proximity correction (OPC) process to the IC design layout in a model-based mode, resulting in a number of jog features on each of the first and second sides of the main feature;

a third module for identifying a candidate jog feature for elimination from the number of jog features present on each of the first and second sides, the identifying based upon evaluation of each jog feature of the number of jog features in sequence, and the identifying based upon at least one parameter from a set of parameters that includes a critical dimension parameter of the main feature, the critical dimension parameter being measured orthogonally to the candidate jog feature, and a spacing parameter, the spacing parameter being a measurement of a spacing between the main feature and an adjacent feature, the third module also for performing a jog reduction process to eliminate the candidate jog feature from each of the first and second sides such that a number of jog features in the IC design layout is reduced, wherein the jog reduction process includes grouping two segments per group on each of the first and second sides when a number of jog features on the either side of the line of symmetry is odd, and wherein the jog reduction process includes grouping segments according to a grouping selected from a group of one, a group of two, and a group of three per group on each of the first and second sides when the number of jog features on each of the first and second sides is even; and a fourth module for fracturing the IC design layout to generate a tape-out of the IC design layout for mask making, wherein an electron beam writer makes a mask using the tape-out generated by the fourth module.

\* \* \* \* \*